(12) United States Patent
Wang et al.

(10) Patent No.: US 10,613,898 B2
(45) Date of Patent: Apr. 7, 2020

(54) APPARATUSES AND METHODS FOR FLEXIBLE SCHEDULING IN A DATABASE SYSTEM

(71) Applicant: ALIBABA GROUP HOLDING LIMITED, George Town, Grand Cayman (KY)

(72) Inventors: Heng Wang, Hangzhou (CN); Xu Chen, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 527 days.

(21) Appl. No.: 15/206,128

(22) Filed: Jul. 8, 2016

(65) Prior Publication Data

US 2017/0011028 A1 Jan. 12, 2017

(30) Foreign Application Priority Data

Jul. 8, 2015 (CN) .......................... 2015 1 0398194

(51) Int. Cl.
*G06F 9/48* (2006.01)
*G06F 9/50* (2006.01)
*G06F 16/21* (2019.01)

(52) U.S. Cl.
CPC .......... *G06F 9/4881* (2013.01); *G06F 9/5088* (2013.01); *G06F 16/214* (2019.01)

(58) Field of Classification Search
CPC ............. G06F 9/5088; G06F 17/30079; G06F 9/4881; G06F 16/214
USPC ........................................................ 707/609
See application file for complete search history.

(56) References Cited

U.S. PATENT DOCUMENTS

| | | | | |
|---|---|---|---|---|
| 7,979,399 B2* | 7/2011 | Barsness | ................. | G06F 16/27 707/662 |
| 8,051,099 B2* | 11/2011 | Hamilton, II | ......... | G06F 16/245 707/783 |
| 9,594,579 B2* | 3/2017 | Shiva | .................. | G06F 9/45533 |
| 2005/0055446 A1* | 3/2005 | Chidambaran | ....... | G06F 9/5088 709/226 |

(Continued)

FOREIGN PATENT DOCUMENTS

| | | |
|---|---|---|
| CN | 101334778 A | 12/2008 |
| CN | 103546571 A | 1/2014 |

(Continued)

OTHER PUBLICATIONS

PCT International Search Report and Written Opinion dated Oct. 4, 2016, issued in corresponding International Application No. PCT/US16/41500 (8 pages).

(Continued)

*Primary Examiner* — Phong H Nguyen
(74) *Attorney, Agent, or Firm* — Finnegan, Henderson, Farabow, Garrett & Dunner LLP

(57) ABSTRACT

Apparatuses and methods are disclosed for database scheduling. An exemplary method may include obtaining a performance parameter associated with a database server. The method may also include determining whether the performance parameter matches a preset condition. After it is determined that the performance parameter matches the preset condition, the method may further include selecting a database instance operating on the database server and migrating the database instance to a receiving database server.

42 Claims, 10 Drawing Sheets

(56) References Cited

U.S. PATENT DOCUMENTS

| | | | |
|---|---|---|---|
| 2007/0116193 A1 | 5/2007 | Cheng et al. | |
| 2007/0185912 A1* | 8/2007 | Gupta | G06F 16/2462 |
| | | | 707/E17.005 |
| 2009/0106571 A1 | 4/2009 | Low et al. | |
| 2009/0307290 A1* | 12/2009 | Barsness | G06F 16/27 |
| | | | 707/E17.032 |
| 2011/0126206 A1* | 5/2011 | Kato | G06F 1/206 |
| | | | 718/103 |
| 2012/0078459 A1 | 3/2012 | Rawle | |
| 2012/0102189 A1* | 4/2012 | Burge | G06F 9/5083 |
| | | | 709/224 |
| 2013/0268734 A1 | 10/2013 | Hotz et al. | |
| 2014/0165063 A1* | 6/2014 | Shiva | G06F 9/45533 |
| | | | 718/1 |
| 2014/0180664 A1 | 6/2014 | Kochunni et al. | |
| 2014/0189689 A1* | 7/2014 | Masuno | G06F 9/5088 |
| | | | 718/1 |
| 2017/0054634 A1* | 2/2017 | Zhou | H04L 45/50 |

FOREIGN PATENT DOCUMENTS

| | | |
|---|---|---|
| CN | 103605698 A | 2/2014 |
| CN | 104572307 A | 4/2015 |

OTHER PUBLICATIONS

First Search Report issued in corresponding Application No. 201510398194.X, dated Jul. 8, 2015 (2 pgs.).

First Office Action issued in corresponding Application No. 201510398194.X by The State Intellectual Property Office of People's Republic of China dated Nov. 14, 2018 (16 pgs.).

* cited by examiner

APPARATUSES AND METHODS FOR FLEXIBLE SCHEDULING IN A DATABASE SYSTEM

CROSS REFERENCE TO RELATED APPLICATION

The present application claims the benefits of priority to Chinese Application No. 201510398194.X, filed Jul. 8, 2015, the entire contents of which have been incorporated herein by reference.

TECHNICAL FIELD

The present application relates to database technologies, and more particularly, to flexible scheduling methods and apparatuses in a database system.

BACKGROUND

The development of cloud computing brings new challenges to database technologies. Traditional database services suitable for servicing a single client or workstation have to evolve into cluster-level or even datacenter-level services. In order to manage and operate the vast amount of database instances involved in such high-level services, database flexible scheduling technology has been introduced and become an important technical solution for supporting a robust clouding computing environment.

In general, database flexible scheduling involves computing a distribution of database instances among database servers according to certain triggering conditions, constrains, and a predetermined scheduling goal. Database instances are then migrated to target database servers according to the computed distribution.

Existing database flexible scheduling technologies normally adopt an optimization approach, such as methods based on minimum cost. In such methods, one or more objective functions may be generated as the first step. Based on the objective functions and various constrains, an optimized scheduling strategy may be obtained through computing and searching for an optimized solution.

Existing database flexible scheduling technologies, however, have several disadvantages. First, the computational jitter is relatively large, which may cause instability of the database service. This is because the optimization-based methods may be sensitive to performance changes of database instances, causing recomputation of the objective functions and the corresponding scheduling strategy, which in turn may cause local or even global jitters, affecting the stability of the database service. Second, the cost of migration is normally quite significant. This is because the optimization-based scheduling methods aim to achieve an optimal distribution based on pure mathematical consideration, which would normally cause migration of a large number of database instances. Third, the computation is normally very complex and inefficient. As the number of the objective functions increases, the computation cost increases almost exponentially.

SUMMARY

In one aspect, the present disclosure is directed to a method for performing database scheduling. The method may include obtaining a performance parameter associated with a database server. The method may also include determining whether the performance parameter matches a preset condition. After it is determined that the performance parameter matches the preset condition, the method may further include selecting a database instance operating on the database server and migrating the database instance to a receiving database server.

In another aspect, the present disclosure is directed to an apparatus for performing database scheduling. The apparatus may include a memory device storing computer-readable instructions. The apparatus may also include a processor device communicatively coupled to the memory device. The computer-readable instructions, when executed by the processor device, may cause the processor device to perform various operations. The operations may include obtaining a performance parameter associated with a database server. The operations may also include determining whether the performance parameter matches a preset condition. After it is determined that the performance parameter matches a preset condition, the operations may further include selecting a database instance operating on the database server and migrating the database instance to a receiving database server.

In a further aspect, the present disclosure is directed to a non-transitory computer-readable medium that stores a set of instructions that is executable by at least one processor of a device to cause the device to perform a method for performing database scheduling. The method may include obtaining a performance parameter associated with a database server. The method may also include determining whether the performance parameter matches a preset condition. After it is determined that the performance parameter matches the preset condition, the method may further include selecting a database instance operating on the database server and migrating the database instance to a receiving database server.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

The present application discloses methods and apparatuses for performing database scheduling. Database scheduling refers to a technology for determining a distribution of database instances among database servers and migrating one or more database instances into one or more target database servers according to the distribution. Advanced database scheduling methods that provide enhanced flexibility and scalability may often be referred to as flexible database scheduling methods or elastic database scheduling methods. For simplicity, the term database scheduling is used to refer to such advanced database scheduling methods, which are the subject of this application.

A database instance is a set of memory structures that manage database files. A database is a set of physical files stored on one or more storage devices such as hard drive disks. A database server is a computer server that provides database services by hosting one or more database instances.

Figure 1:
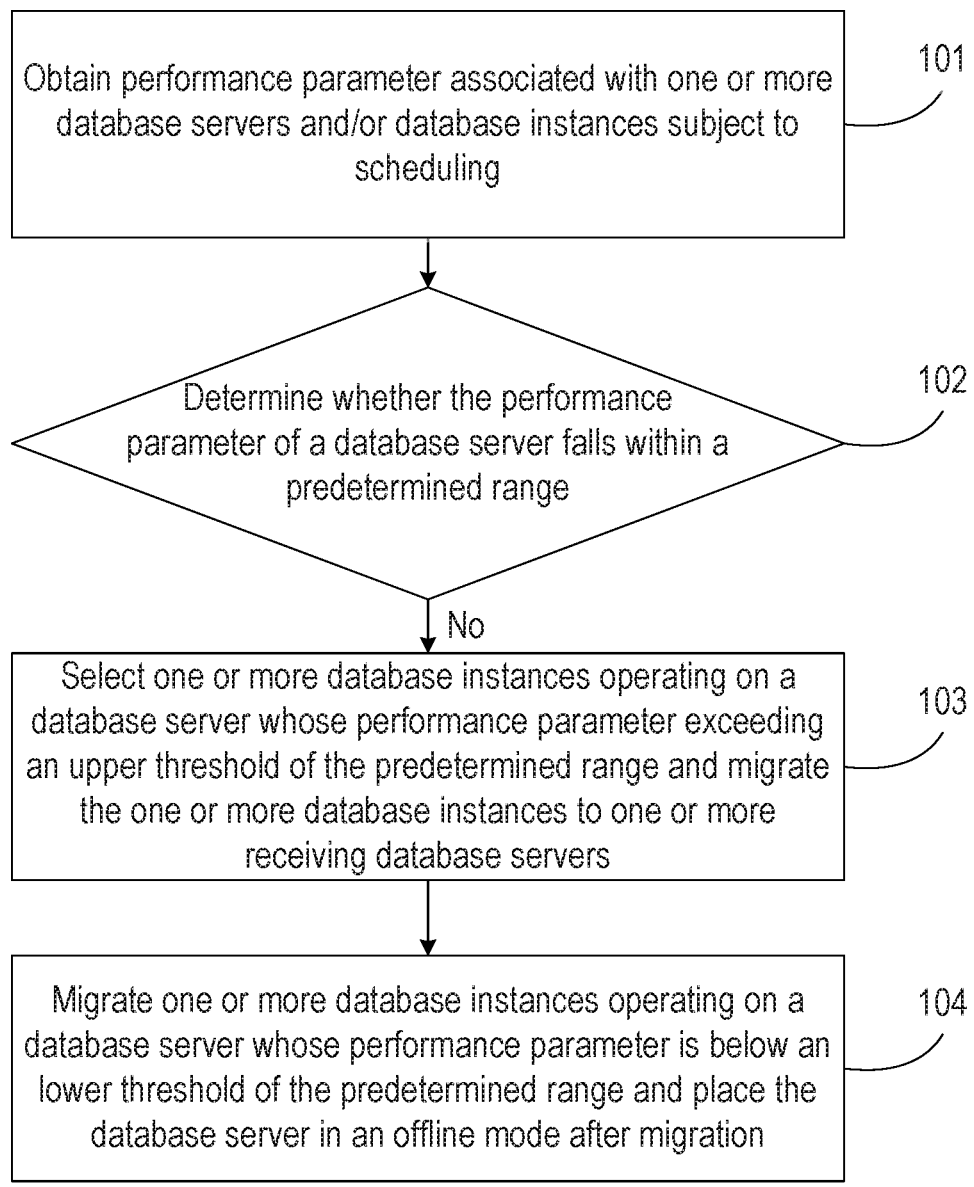
FIG. 1 is a flow chart of an exemplary database scheduling method, according to some embodiments of the present application.

FIG. 1 is a flow chart of an exemplary method 100 for performing database scheduling. Method 100 may include several steps.

In step 101, method 100 may include obtaining performance parameters associated with database servers and/or database instances that are subject to scheduling.

A database cluster may include a plurality of database servers. Each database server may host a plurality of database instances. Each database instance may provide database service to one or more users.

In some embodiments, a range of performance parameters may be predetermined for each of the database servers and/or instances. A database server/instance may be deemed operating properly when its performance parameter falls within the predetermined range.

When the performance parameter of a database server exceeds an upper threshold of the predetermined range, such as a capability threshold associated with that database server, the database server, as well as the database instances operating on the database server, is considered overloaded and may not be able to provide stable service. Under this situation, technical solutions disclosed in the present application may be used to reduce the workload of the database server by migrating one or more database instances to another database server according to a flexible scheduling strategy. The disclosed method is based on considerations of the intrinsic characteristics of the database services. After migration, the performance parameter of the database server may be reduced to a level within the predetermined range, avoiding risks associated with overloading the database server.

On the other hand, when the performance parameter of a database server is below a lower threshold of the predetermined range, the database server is considered underutilized. In this case, the CPU usage rate and the memory usage rate may be relatively low, causing a waste of system resources. Under this situation, technical solutions disclosed in the present application may be used to migrate all database instances operating on the database server to one or more other database servers. After migration, the underutilized database server no longer hosts any database instance and can be taken offline (e.g., be placed in an offline mode) to save system resources.

A performance parameter may be a performance indicator reflecting the operating condition of a database server or a database instance. In some embodiments, each database server and each database instance operating on the database server may have a corresponding performance parameter. A performance parameter may include one or more performance indicators, such as at least one of: CPU usage (e.g., in percentage), memory usage (e.g., in percentage), disk I/O speed, network transmission speed, or disk usage (e.g., in percentage). Other suitable performance parameter may also be used.

In some embodiments, the performance parameter may include one or more dimensions to indicate a single or multiple operation conditions of a database server/database instance. For example, the performance parameter may include two, three, four, or more dimensions, each corresponding to a performance indicator.

The predetermined range refers to a predetermined performance parameter values defining a range including a lower threshold and an upper threshold. The predetermined range may be set according to the physical configurations of the database servers.

The performance parameter may be obtained using tools provided by the operating system on which the database servers operate.

In step 102, method 100 may include determining whether the performance parameter of a database server matches a preset condition, such as whether the performance parameter falls within or outside of a predetermined range. In some embodiments, the preset condition may include a condition that the performance parameter falls outside of a predetermined range. In other embodiments, the preset condition may include a condition that the performance parameter falls within a predetermine range.

When the performance parameter falls within the predetermined range, no further scheduling operation is needed. The predetermined range can provide a certain tolerance to small-scale performance fluctuations, thereby reducing computational jittering.

When the performance parameter falls outside of the predetermined range, method 100 proceeds to step 103 and/or step 104, depending on whether the performance parameter is above the upper threshold or below the lower threshold of the predetermined range.

When the performance parameter is above (e.g., exceeds) the upper threshold, method 100 proceeds to step 103, in which one or more database instances operating on the database server are migrated to other one or more database servers to reduce the workload of the database server originally hosting these database instances.

The one or more database servers receiving the one or more migrating database instances may be referred to as receiving database servers. In some embodiments, a receiving database server may be a database server whose performance parameter is below the lower threshold of the predetermined range (e.g., the receiving database server is underutilized and receiving database instances helps to boost the utilization rate of the receiving database server). In other embodiments, a receiving database server may be a database server whose performance parameter is below the upper threshold of the predetermine range (e.g., the receiving database server is operating properly and is neither underutilized nor overloaded).

In some embodiments, the receiving database server may be selected such that after receiving the migrating database instance, the performance parameter of the receiving database server remains under the upper threshold of the predetermined range. In this way, the receiving database server will not become overloaded solely because of the acceptance of the migrating database instance.

Figure 2:
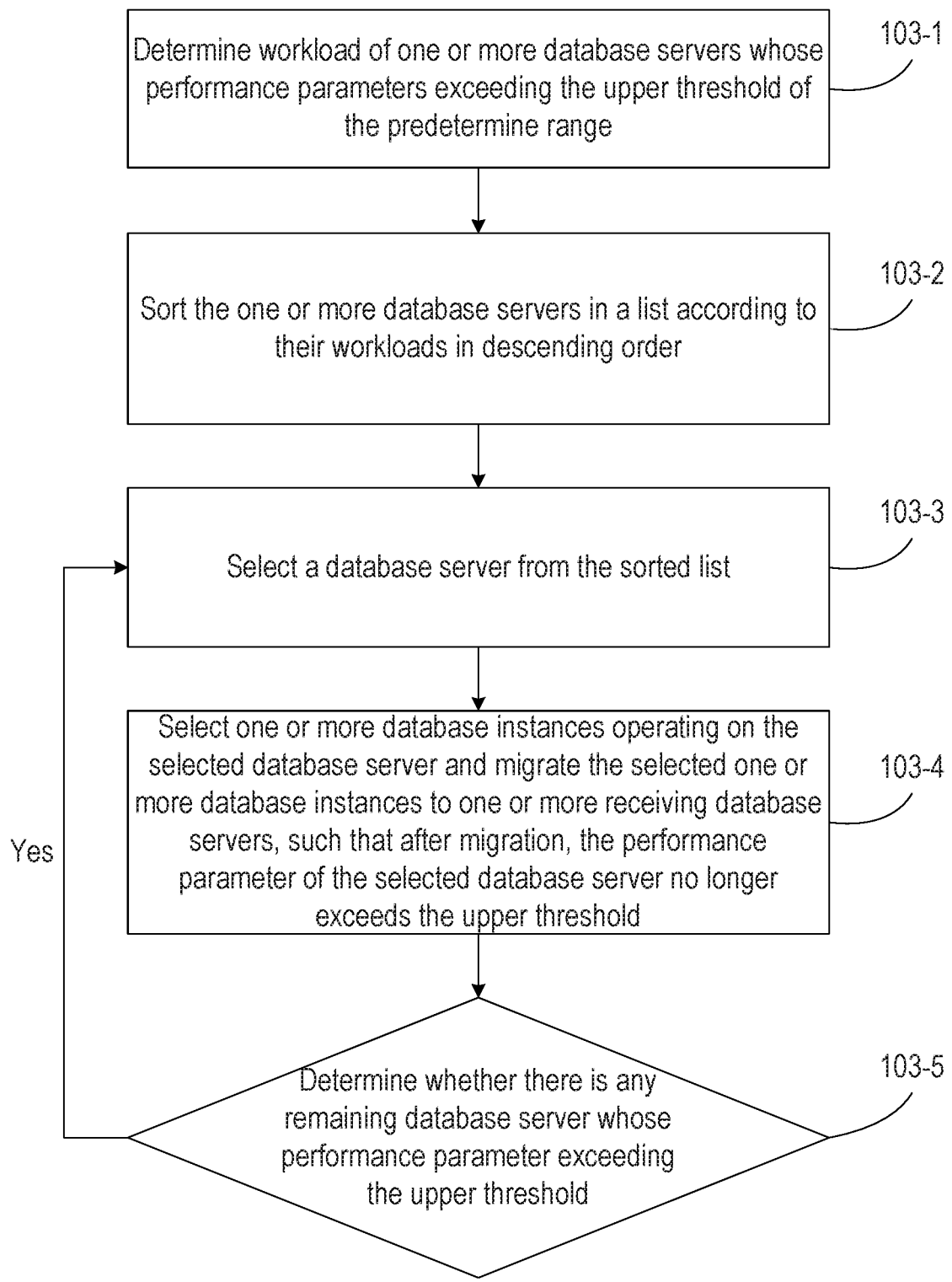
FIG. 2 is a flow chart of an exemplary database instance migration method, according to some embodiments of the present application.

FIG. 2 shows a flow chart of an exemplary method for migrating database instances.

In step 103-1, the method may include determining workloads for those database servers whose performance parameters exceed the upper threshold of the predetermine range. The workload of a database server may be determined based on the performance parameter of that database server. In some embodiments, the workload may refer to the load of the database server. In other embodiments, other values may also be used to indicate the workload of the database server.

In step 103-2, the method may include sorting the database servers whose performance parameters exceed the upper threshold according to their workloads. The sorted list of database servers may be arranged in a descending order (e.g., from the heaviest workload to the lightest workload).

In step 103-3, the method may include selecting a database server from the sorted list. In some embodiments, database servers having heavier workloads may be preferably selected over database servers having lighter workloads. Database servers having heavier workloads may have a higher probability to encounter problems than those having lighter workloads. Therefore, preferably selecting database servers having heavier workloads may reduce the overall risk of failure for the database server cluster. In some embodiments, the selection may be conducted sequentially down the list, from the database server having the heaviest workload to the database server having the lightest workload.

In step 103-4, the method may include selecting one or more database instances from all database instances operating on the selected database server and migrating the one or more database instances to one or more receiving database servers, such that after migration, the performance parameter of the selected database server no longer exceeds the upper threshold of the predetermined range.

Specifically, step 103-4 may include selecting a database instance that satisfies a preset condition. The preset condition may include ranking relatively high in a list of database instances operating on the selected database server that are arranged according to their performance parameters in an ascending order (e.g., from the smallest parameter value to the highest parameter value). The performance parameter may include any performance indicator selected from CPU usage, memory usage, disk I/O speed, network transmission speed, and disk usage. The performance parameter may also be calculated as a combined performance indicator based on any combination of the above performance indicators.

In some embodiments, a database instance having a relatively small performance parameter (e.g., the smallest performance parameter) may be selected as the migrating database instance.

After being selected, the database instance may be migrated to another database server (e.g., a receiving database server) whose performance parameter, after accepting the migrating database instance, would remain under the upper threshold of the predetermined range so that the receiving database server would not become overloaded be accepting the migrating database instance.

Specifically, the migration process can be conducted as follows:

1) requesting initialization of a database instance in the receiving database server;
2) loading and executing the migrating database instance on the initialized database instance; and
3) taking the migrating database instance offline from the database server originally hosting the migrating database instance.

Once a database instance has been emigrated, step 103-4 may include determining whether the performance parameter of the database server (e.g., the database server originally hosting the migrating database instance, hereinafter referred to as the hosting database server) offloading the migrating database instance still exceeds the upper threshold of the predetermined range. If yes, then the process repeats the database instance selection and migration operations until the performance parameter of the hosting database server no longer exceeds the upper threshold of the predetermined range. If no, then it indicates that the hosting database server is no longer overloaded. The process then proceeds to step 103-5.

In step 103-5, the method may include determining whether there is any remaining database server whose performance parameter exceeding the upper threshold of the predetermined range. If yes, then the process loops back to step 103-3 to select the next database server to offload one or more database instances. If no, then step 103 completes, indicating that all overloaded database servers subject to scheduling have been processed.

Referring back to FIG. 1, step 103 involves operations for reducing workloads of those overloaded database servers, while step 104 involves operations for taking those underutilized database servers offline to save system resources. Steps 103 and 104 may be performed in any order, or may be performed concurrently in separate threads. In step 104, the method may include selecting and migrating all database instances operating on an underutilized database server to one or more other database servers (e.g., receiving database servers), such that the underutilized database server no longer hosts any database instance and can be taken offline.

As described above, a database server may be deemed underutilized when its performance parameter is below the lower threshold of the predetermined range. The one or more receiving database servers that accept the migrating database instances may be selected according to the same conditions as in step 103. For example, a receiving database server can be another underutilized database server whose performance parameter is below the lower threshold. In another example, a receiving database server can be a properly operating database server that is neither underutilized nor overloaded (e.g., the performance parameter falls within the predetermined range).

Figure 3:
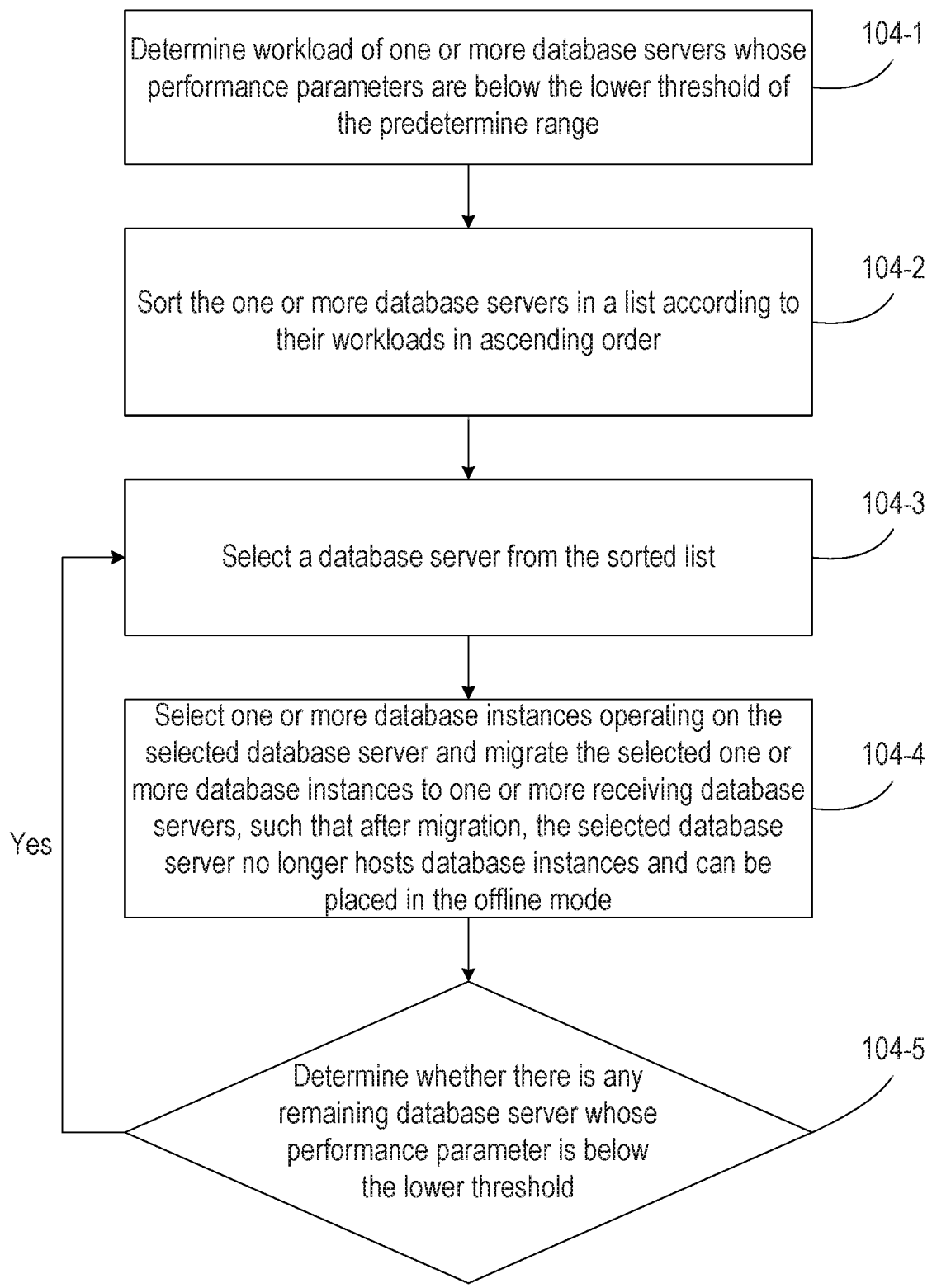
FIG. 3 is a flow chart of another exemplary database instance migration method, according to some embodiments of the present application.

FIG. 3 shows an exemplary database instance migration method implementing step 104. The method shown in FIG. 3 is similar to the method shown in FIG. 2. Therefore, the duplicated portions will be omitted, which can be referred to the corresponding description of FIG. 2.

In step 104-1, the method may include determining workloads for those database servers whose performance parameters are below the lower threshold of the predetermine range.

In step 104-2, the method may include sorting the database servers whose performance parameters are below the lower threshold according to their workloads. The sorted list of database servers may be arranged in an ascending order (e.g., from the lightest workload to the heaviest workload).

In step 104-3, the method may include selecting a database server from the sorted list. In some embodiments, database servers having lighter workloads may be preferably selected over database servers having heavier workloads. Database servers having lighter workloads may waste more system resources than those having heavier workloads. Therefore, preferably selecting database servers having lighter workloads may take offline these resource wasters earlier, thereby saving the overall system resources. In some embodiments, the selection may be conducted sequentially down the list, from the database server having the lightest workload to the database server having the heaviest workload.

In step 104-4, the method may include selecting one or more database instances from all database instances operating on the selected database server and migrating the one or more database instances to one or more receiving database servers. After all database instances have been migrated, the selected database server no longer hosts any database instance and can be taken offline.

Specifically, step 104-4 may include selecting a database instance that satisfies a preset condition. The preset condition may include ranking relatively high in a list of database instances operating on the selected database server that are arranged according to their performance parameters in an ascending order (e.g., from the smallest parameter value to the highest parameter value).

In some embodiments, a database instance having a relatively small performance parameter (e.g., the smallest performance parameter) may be selected as the migrating database instance.

After being selected, the database instance may be migrated to another database server (e.g., a receiving database server) whose performance parameter, after accepting the migrating database instance, would remain under the upper threshold of the predetermined range so that the receiving database server would not become overloaded be accepting the migrating database instance.

In some embodiments, the migration may also help to increase the utilization rate of another underutilized database server. For example, the receiving database server may be an underutilized database server whose performance parameter is below the lower threshold of the predetermined range.

After a database instance has been emigrated, step 104-4 may include determining whether the hosting database server still hosts any database instance. If yes, then the process repeats the database instance selection and migration operations until the hosting database server no longer hosts any database instance. If no, then it indicates that the hosting database server no longer hosts any database instance and the database server can be taken offline. The process then proceeds to step 104-5.

In step 104-5, the method may include determining whether there is any remaining database server whose performance parameter is below the lower threshold of the predetermined range. If yes, then the process loops back to step 104-3 to select the next database server to offload all its database instances. If no, then step 104 completes, indicating that all underutilized database servers subject to scheduling have been processed.

Method 100 of FIG. 1 conducts database scheduling through setting a predetermined range. Database servers whose performance parameters exceed the upper threshold of the predetermined range are considered overloaded, and their database instances can be migrated to other database servers to reduce their workload back to a level within the predetermine range, thereby enhancing the stability of the services. On the other hand, database servers whose performance parameters are below the lower threshold of the predetermined range are considered underutilized, and their database instances can be migrated to other database servers such that they can be taken offline to save system resources. In addition, by setting a predetermined range and foregoing any migration operation when the performance parameter of a database server falls within the range, method 100 is resilient to insignificant performance fluctuations during real time operations, avoiding system jittering, and reducing scheduling cost.

Figure 4:
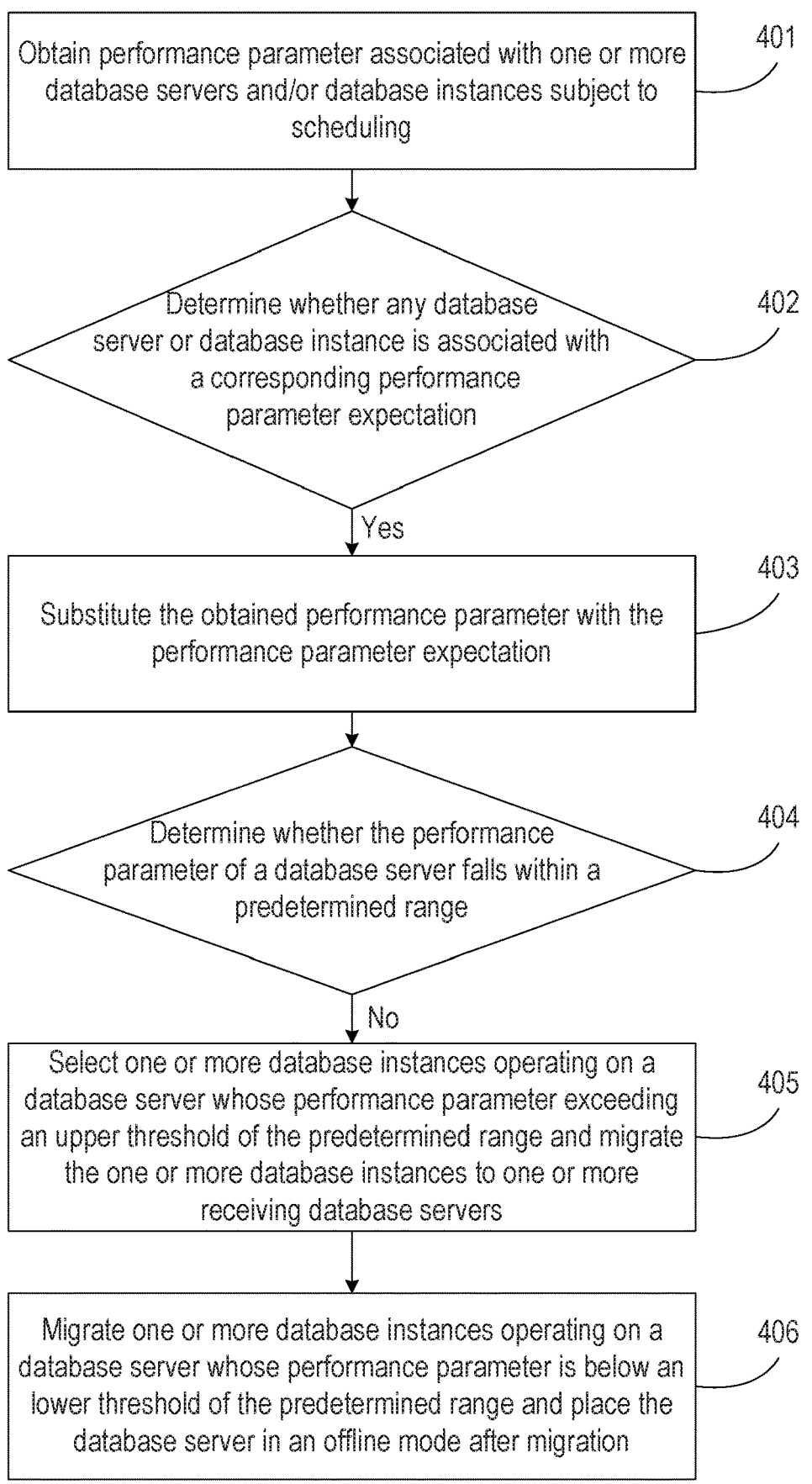
FIG. 4 is a flow chart of another exemplary database scheduling method, according to some embodiments of the present application.

FIG. 4 shows a flow chart of another exemplary method 400 for performing database scheduling. Some steps shown in FIG. 4 are similar to those shown in FIG. 1. Therefore, duplicative description is omitted.

In step 401, method 400 may include obtaining performance parameters associated with database servers and/or database instances that are subject to scheduling.

A database cluster may include a plurality of database servers. When the database servers within a database cluster are non-uniform, such as having different hardware and/or software configurations, the scheduling strategy may be affected. For example, the complexity of the scheduling algorithm may be increased to account for the non-uniformity. In addition, during events such as holding promotions, adding new functions, or adding new businesses, the fluctuations of database server workloads may increase, causing system jittering.

To solve the above problem, method 400 introduces the concept of expectation factor. The expectation factor is a customized configuration, which can provide some customized features. The expectation factor can be implemented by setting a performance parameter expectation for a database server or a database instance subject to scheduling.

In step 402, method 400 may include determining whether any database server or database instance is associated with a corresponding performance parameter expectation. If yes, then method 400 proceeds to step 403, in which the performance parameter of the database server/instance obtained in step 401 is substituted with the corresponding performance parameter expectation. If no, then the performance parameter of the database server/instance obtained in step 401 remains the same.

In step 404, method 400 may include determining whether the performance parameter of a database server falls within a predetermined range. Here, the performance parameter may be the original performance parameter obtained in step 401 or the performance parameter expectation, depending on the outcome of step 402.

If the outcome of step 404 is Yes, the method 400 may end because no scheduling operations are needed. For simplicity and clarity, this branch is omitted from FIG. 4.

If the outcome of step 404 is No, then method 400 proceeds to step 405/406, which are similar to 103/104.

In some embodiments, the performance parameter expectation may be associated with a validity period. For example, multiple time periods may be set for a database server/instance, each time period may correspond to a separate performance parameter expectation value.

For each database server subject to scheduling, the validity period can be implemented as follows.

To determine the performance parameter expectation of the database server, it is first determined whether the current time is within a particular validity period.

If yes, then substitute the obtained performance parameter with the performance parameter expectation corresponding to the validity period.

If no, then keep the obtaining performance parameter unchanged.

Similarly, for each database instance subject to scheduling, the validity period can be implemented as follows.

To determine the performance parameter expectation of the database instance, it is first determined whether the current time is within a particular validity period.

If yes, then substitute the obtained performance parameter with the performance parameter expectation corresponding to the validity period.

If no, then keep the obtaining performance parameter unchanged.

Performance parameter expectations can be used to customize the expectation values for particular database servers/instances, reducing the complexity due to the non-uniformity in the database cluster.

In addition, during a promotion event, the performance parameter expectations for those involved database servers/instances may be temporarily increased, avoiding overloading the servers due to data surge. After the promotion event, the performance parameter expectations can be reduced to regular levels, avoiding resource waste.

When new functions or new businesses are introduced, the performance parameter expectations for those involved database servers/instances may be adjusted, meeting the service demands and reducing the number of migrations, thereby reducing the scheduling cost.

Figure 5:
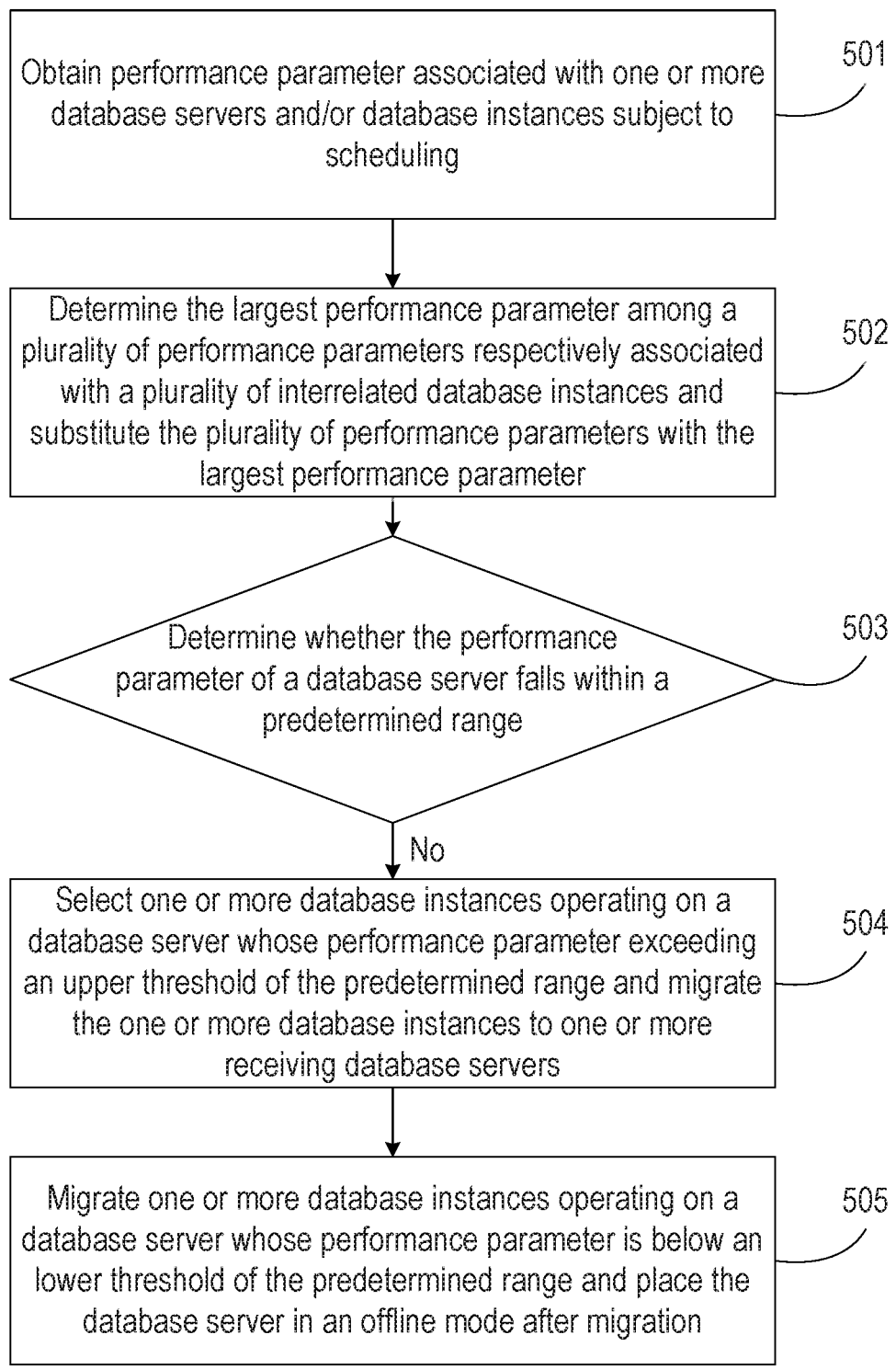
FIG. 5 is a flow chart of another exemplary database scheduling method, according to some embodiments of the present application.

FIG. 5 shows a flow chart of another exemplary method 500 for performing database scheduling. Some steps shown in FIG. 5 are similar to those shown in FIG. 1. Therefore, duplicative description is omitted.

In step 501, method 500 may include obtaining performance parameters associated with database servers and/or database instances that are subject to scheduling.

In general, databases should have a certain level of disaster recovery ability, referring to the ability to handover functionalities among two or more databases in case one of the databases experiences problems. This way, the backup database(s) may take over the functionalities to ensure continued availability of the database services. For example, in MySQL, databases are often prepared in pairs, such as Master↔Slave pairs (wherein the master database and the slave database are mutual backups of each other) and Master→Slave pairs (where the slave database is a backup of the master database). In some cases, multiple slave databases may be cascaded, such as Slave→Master←Slave←Slave.

In some embodiments, master and slave databases provide different services. For example, master database serves read and write requests, while slave database does not provide any services or only provide a limited amount of services. Because the differences in services, the performance parameters associated with master and slave databases may also be different. In general, the performance parameter of a master database is far greater than the performance parameter of a slave database.

When the master database experiences problems, the disaster recovery mechanism may be initialized to switch the slave database to the role of the master database. The master database, after repair, may be switched to the role of the slave database. In this case, because the workload of the former slave database is relatively light before the switching, during database scheduling, some database instances may be migrated to the former slave database. In addition, after switching, the former slave database may experience much heavier workload for performing the role of a master database. Therefore, it is possible or even likely that overloading conditions occur to the former slave database after switching. Under certain situations, the switching may risk the possibility of failure.

To avoid the above problem, the present application introduces the concept of master-slave consistency. The consistency refers to a configuration that the performance parameters for the master and slave databases are kept the same, shielding the actual performance differences between the two, thereby avoiding the problems caused by the performance differences.

In step 502, method 500 may include determining the largest performance parameter among a plurality of performance parameters respectively associated with a plurality of interrelated database instances, and substituting the plurality of performance parameters with the largest performance parameter.

For example, the interrelated database instances may include a master database instance and a slave database instance, which is a backup of the master database instance and is therefore normally associated with a much smaller performance parameter than the master database instance. More interrelated database instances may form a group according to particular disaster recovery mechanisms and backup relationship. In this case, the largest performance parameter, normally associated with the master database instance, may be used as the common performance parameter for the entire group.

For each group of interrelated database instances, the largest performance parameter can be determined and selected based on the performance parameters obtained in step 501. The largest performance parameter may then be used as the performance parameter for each of the database instances in the group.

The relationship among the interrelated database instances in the group may include a master-slave or master-backup relationship, such as one master—one backup or one master—multiple backup. Other relationship may also be used to establish the connections among the database instances to form a group.

In step 503, method 500 may include determining whether the performance parameter of a database server falls within a predetermined range, similar to step 102.

If no, method 500 may proceed to step 504/505, similar to steps 103/104.

Using a common performance parameter for a group of interrelated database instances may reduce the risk of overloading during master-slave switching, enhancing the stability of services.

Figure 6:
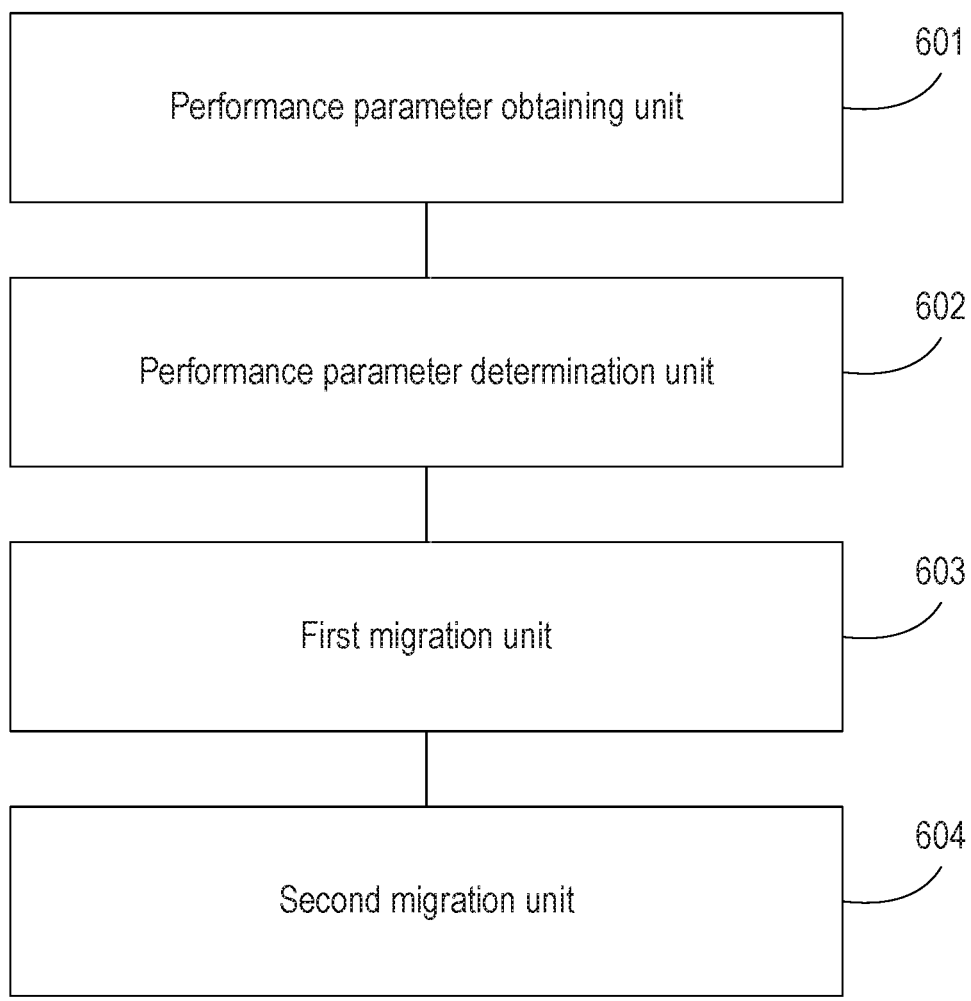
FIG. 6 is a schematic diagram of an exemplary database scheduling apparatus, according to some embodiments of the present application.

The above passages are described in connection with exemplary methods for performing database scheduling. The present application also discloses apparatuses for performing the database scheduling, corresponding to the methods. FIG. 6 shows a functional block diagram of an exemplary apparatus. Because the functions of each block shown in FIG. 6 correspond to the steps shown in FIG. 1, detail description of FIG. 6 is omitted. The following description is for illustrative purposes.

As shown in FIG. 6, apparatus 600 may include a performance parameter obtaining unit 601 configured to obtain performance parameters associated with database servers and/or database instances subject to scheduling. Apparatus 600 may also include a performance parameter determination unit 602 configured to determine whether the performance parameter of a database server falls within a predetermined range. Apparatus 600 may also include a first migration unit 603 configured to select one or more database instances operating on a database server whose performance parameter exceeding an upper threshold of the predetermined range and migrate the one or more database instances to one or more receiving database servers. Apparatus 600 may further include a second migration unit 604 configured to migrate one or more database instances operating on a database server whose performance parameter is below a lower threshold of the predetermined range. After migration, the database server no longer hosting any database instances may be placed in an offline mode to save system resources.

Figure 7:
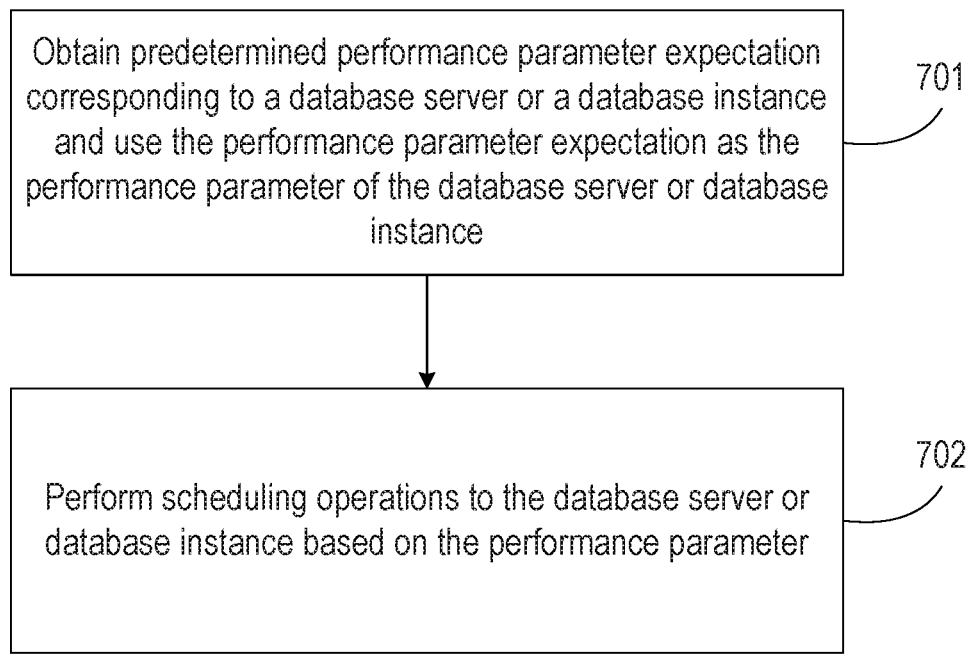
FIG. 7 is a flow chart of another exemplary database scheduling method, according to some embodiments of the present application.

FIG. 7 shows a flow chart of another exemplary database scheduling method 700.

In step 701, method 700 may include obtaining a predetermined performance parameter expectation corresponding to a database server of a database instance, and use the performance parameter expectation as the performance parameter of the database server/instance.

In step 702, method 700 may include performing scheduling operations to the database server/instance based on the performance parameter expectation.

Step 701 of method 700 is similar to step 403 of method 400. In method 700, the performance parameter expectation concept is used as a standalone step, which can be coupled to any suitable database scheduling methods to improve the stability of the services.

Figure 8:
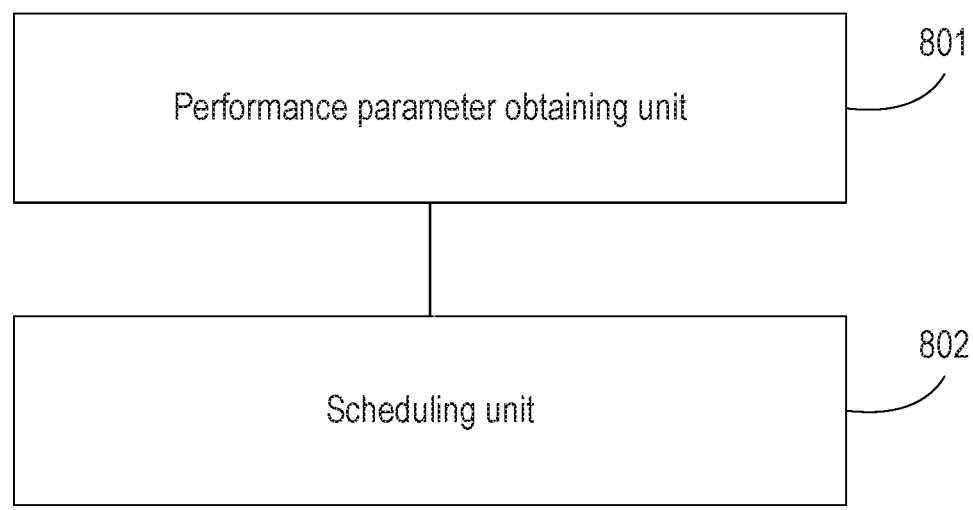
FIG. 8 is a schematic diagram of another exemplary database scheduling apparatus, according to some embodiments of the present application.

FIG. 8 shows a functional block diagram of an exemplary apparatus 800 configured to perform method 700. Apparatus 800 may include a performance parameter obtaining unit configured to obtain a predetermined performance parameter expectation corresponding to a database server or a database instance, and use the performance parameter expectation as the performance parameter of the database server/instance. Apparatus 800 may also include a scheduling unit 802 configured to perform scheduling operations to the database server/instance based on the performance parameter expectation.

Figure 9:
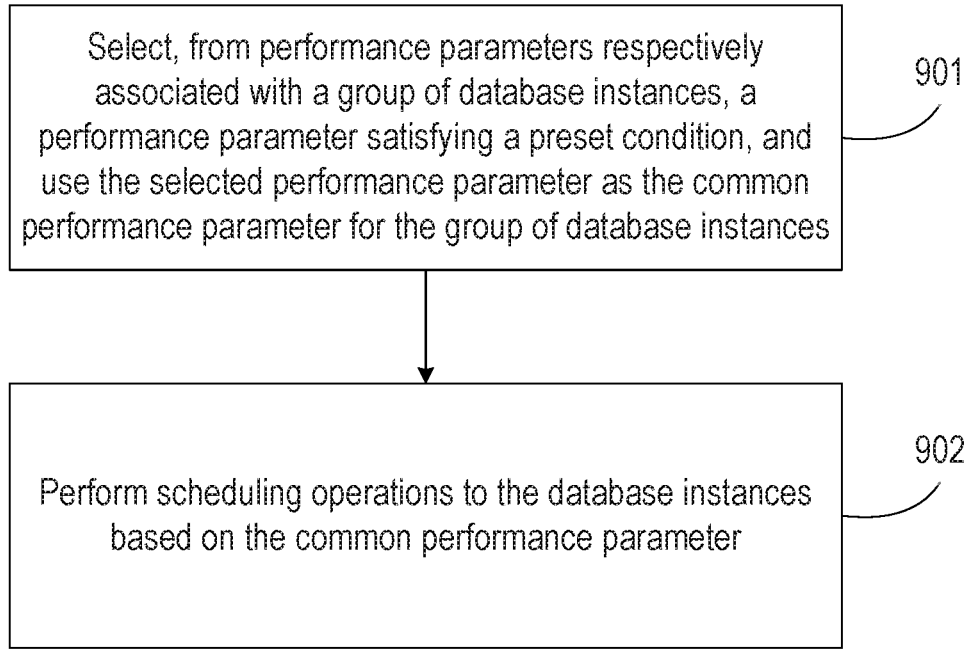
FIG. 9 is a flow chart of another exemplary database scheduling method, according to some embodiments of the present application.

FIG. 9 shows a flow chart of another exemplary database scheduling method 900.

In step 901, method 900 may include selecting, from performance parameters respectively associated with a group of database instances, a performance parameter satisfying a preset condition, and using the selected performance parameter as the common performance parameter for the entire group. The preset condition may include ranking relatively high in a sorted list of database instances arranged in a descending order. For example, the largest performance parameter may be set as the common performance parameter for the group.

In step 902, method 900 may include performing scheduling operations to the database instances based on the common performance parameter.

Step 901 of method 900 is similar to step 502 of method 500. In method 900, the common performance parameter concept is used as a standalone step, which can be coupled to any suitable database scheduling methods to improve the stability of the services.

Figure 10:
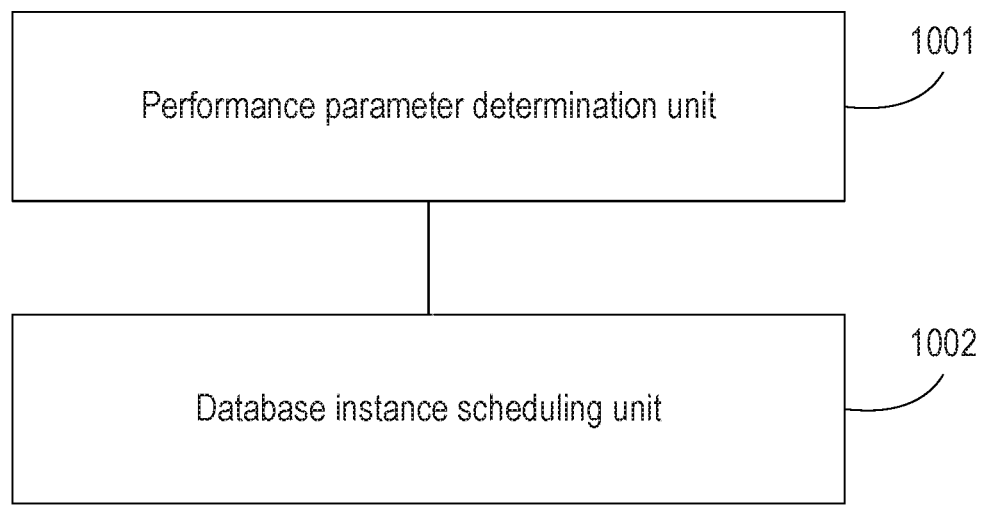
FIG. 10 is a schematic diagram of another exemplary database scheduling apparatus, according to some embodiments of the present application.

FIG. 10 shows a functional block diagram of an exemplary apparatus 1000 configured to perform method 900. Apparatus 1000 may include a performance parameter determination unit 1001 configured to obtain a predetermined performance parameters of a group of database instances; select, from performance parameters respectively associated with a group of database instances, a performance parameter satisfying a preset condition; and use the selected performance parameter as the common performance parameter for the entire group. Apparatus 1000 may also include a database instance scheduling unit 1002 configured to perform scheduling operations to the database instances based on the common performance parameter.

Apparatuses 600, 800, and 1000 may be implemented by a computer device including a memory device and a processor device. The memory device may store computer-readable instructions. The instructions, when executed by the processor device, may cause the processor device to perform operations and functions of the various units shown in FIGS. 6, 8, and 10, as well as the functions and operations of the method shown in FIGS. 1-5, 7, and 9.

The specification has described apparatuses and methods for performing database scheduling. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined as long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Embodiments of the present application may be implemented using hardware, software, firmware, or any combination thereof for allowing a specialized device to perform the functions described above. One or more steps, operations, functions, and modules described herein may be implemented by software instructions or codes stored in one or more memory devices and executed by one or more hardware processor devices. Exemplary hardware processor devices include logic gate circuitry configured or made to perform data processing and/or logic operations, integrated circuits (ICs) designed and made to perform specific functions, programmable gate arrays (PGAs), field-programmable gate arrays (FPGAs), etc.

Multiple function modules may be integrated into a single physical device, or may be provided in separate physical devices.

Furthermore, one or more computer-readable storage media may be utilized in implementing embodiments consistent with the present disclosure. A computer-readable storage medium refers to any type of physical and/or non-transitory memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible and/or non-transitory items and exclude carrier waves and transient signals, i.e., be non-transitory. Examples of non-transitory computer-readable medium include RAM, ROM, a volatile memory, a nonvolatile memory, a hard drive, a CD ROMs, a DVD, a flash drive, a flash memory, a cache, a register, a disk, and any other known storage media.

It is intended that the disclosure and examples be considered as exemplary only, with a true scope and spirit of disclosed embodiments being indicated by the following claims.

What is claimed is:

1. A method for performing database scheduling performed by one or more apparatuses having one or more memories, the method comprising:
    obtaining a performance parameter associated with associated with each of a plurality of database servers;
    determining a list of one or more database servers of the plurality of database servers having performance parameters that do not fall within a predetermined range;
    sorting the one or more database servers in the list according to their respective workloads indicated by the corresponding performance parameters;
    selecting a first database server among the sorted one or more database servers, wherein the first database server has a heaviest workload;
    selecting one or more database instances operating on the first database server, wherein each of the one or more database instances is a set of memory structures that manage database files; and
    instructing the first database server to migrate the one or more database instances to a-one or more receiving database servers.

2. The method of claim 1, wherein:
    the performance parameter includes at least one of: CPU usage, memory usage, disk input/output speed, network transmission speed, or disk usage.

3. The method of claim 1, wherein:
    the predetermined range includes an upper threshold; and performance parameters associated with each of the one or more receiving database servers is are below the upper threshold.

4. The method of claim 1, wherein:
    the predetermined range includes a lower threshold; and performance parameters associated with each of the one or more receiving database servers are below the lower threshold.

5. The method of claim 1, further comprising:
    determining whether a database server of the plurality of database servers is associated with a corresponding performance parameter expectation; and
    after it is determined that the database server is associated with the corresponding performance parameter expectation, substituting the obtained performance parameter with the performance parameter expectation.

6. The method of claim 5, wherein the performance parameter expectation is associated with a validity period, and the method further comprises:
    determining whether a current time is within the validity period; and
    after it is determined that the current time is within the validity period, substituting the obtained performance parameter with the performance parameter expectation.

7. The method of claim 1, further comprising:
    obtaining a performance parameter associated with a database instance of the one or more database instances;
    determining whether the database instance is associated with a corresponding performance parameter expectation; and
    after it is determined that the database instance is associated with a corresponding performance parameter expectation, substituting the obtained performance parameter associated with the database instance with the performance parameter expectation.

8. The method of claim 7, wherein the performance parameter expectation is associated with a validity period, and the method further comprises:
    determining whether a current time is within the validity period; and
    after it is determined that the current time is within the validity period, substituting the obtained performance parameter associated with the database instance with the performance parameter expectation.

9. The method of claim 1, wherein a database server of the plurality of database servers includes a plurality of database instances interrelated to one another, and the method further comprises:
    determining a performance parameter associated with each of the plurality of database instances;
    determining a largest performance parameter from the plurality of performance parameters respectively determined for the plurality of database instances; and
    substituting the performance parameter associated with each of the plurality of database instances with the largest performance parameter.

10. The method of claim 9, wherein the plurality of database instances include a master database instance and a backup of the master database instance.

11. The method of claim 1, wherein selecting one or more database instances operating on the database server comprises selecting one or more database instances operating on the first database server, such that after migrating the selected one or more database instances from the first database server, the performance parameter of the first database server falls within the predetermined range.

12. The method of claim 1, wherein selecting the one or more database instances includes:
    sorting database instances operating on the first database server according to their respective workloads;
    selecting a first database instance from the sorted database instances, wherein the first database instance has a lowest workload; and
    selecting additional one or more database instances from the sorted database instances for migration according to an ascending order of workload until the performance parameter of the first database server falls within the predetermined range after migration.

13. The method of claim 1, further comprising:
placing the first database server in an offline mode after migration.

14. The method of claim 13, further comprising:
sorting the one or more database servers in the list according to their respective workloads indicated by the corresponding performance parameters; and
selecting the first database server from the sorted one or more database servers, wherein the first database server has a lightest workload.

15. An apparatus for performing database scheduling, comprising:
a memory device that stores computer-readable instructions; and
a processor device communicatively coupled to the memory device, wherein the computer-readable instructions, when executed by the processor device, cause the apparatus to perform operations including:
obtaining a performance parameter associated with each of a plurality of database servers;
determining a list of one or more database servers of the plurality of database servers having performance parameters that do not fall within a predetermined range;
sorting the one or more database servers in the list according to their respective workloads indicated by the corresponding performance parameters;
selecting a first database server among the sorted one or more database servers, wherein the first database server has a heaviest workload;
selecting one or more database instances operating on the first database server, wherein each of the one or more database instances is a set of memory structures that manage database files; and
instructing the first database server to migrate the one or more database instances to one or more receiving database servers.

16. The apparatus of claim 15, wherein:
the performance parameter includes at least one of: CPU usage, memory usage, disk input/output speed, network transmission speed, or disk usage.

17. The apparatus of claim 15, wherein:
the predetermined range includes an upper threshold; and
performance parameters associated with each of the one or more receiving database servers are below the upper threshold.

18. The apparatus of claim 15, wherein:
the predetermined range includes a lower threshold; and
performance parameters associated with each of the one or more receiving database servers are below the lower threshold.

19. The apparatus of claim 15, wherein the operations further comprise:
determining whether a database server of the plurality of database servers is associated with a corresponding performance parameter expectation; and
after it is determined that the database server is associated with the corresponding performance parameter expectation, substituting the obtained performance parameter with the performance parameter expectation.

20. The apparatus of claim 19, wherein the performance parameter expectation is associated with a validity period, and the operations further comprise:

determining whether a current time is within the validity period; and
after it is determined that the current time is within the validity period, substituting the obtained performance parameter with the performance parameter expectation.

21. The apparatus of claim 15, wherein the operations further comprise:
obtaining a performance parameter associated with a database instance of the one or more database instances;
determining whether the database instance is associated with a corresponding performance parameter expectation; and
after it is determined that the database instance is associated with a corresponding performance parameter expectation, substituting the obtained performance parameter associated with the database instance with the performance parameter expectation.

22. The apparatus of claim 21, wherein the performance parameter expectation is associated with a validity period, and the operations further comprise:
determining whether a current time is within the validity period; and
after it is determined that the current time is within the validity period, substituting the obtained performance parameter associated with the database instance with the performance parameter expectation.

23. The apparatus of claim 15, wherein a database server of the plurality of database servers includes a plurality of database instances interrelated to one another, and the operations further comprise:
determining a performance parameter associated with each of the plurality of database instances;
determining a largest performance parameter from the plurality of performance parameters respectively determined for the plurality of database instances; and
substituting the performance parameter associated with each of the plurality of database instances with the largest performance parameter.

24. The apparatus of claim 23, wherein the plurality of database instances include a master database instance and a backup of the master database instance.

25. The apparatus of claim 15, wherein the selecting one or more database instances operating on the database server comprises selecting one or more database instances operating on the first database server, such that after emigrating the selected one or more database instances from the first database server, the performance parameter of the first database server falls within the predetermined range.

26. The apparatus of claim 15, wherein the operation of selecting the one or more database instances includes:
sorting database instances operating on the first database server according to their respective workloads;
selecting a first database instance from the sorted database instances, wherein the first database instance has a lowest workload; and
selecting additional one or more database instances from the sorted database instances for migration according to an ascending order of workload until the performance parameter of the first database server falls within the predetermined range after migration.

27. The apparatus of claim 15, wherein the operations further comprise placing the first database server in an offline mode after migration.

28. The apparatus of claim 27, wherein the operations further comprise:

sorting the one or more database servers in the list according to their respective workloads indicated by the corresponding performance parameters; and selecting the first database server from the sorted one or more database servers, wherein the first database server has a lightest workload.

29. A non-transitory computer-readable medium that stores a set of instructions that is executable by at least one processor of a device to cause the device to perform a method for performing database scheduling, the method comprising:

obtaining a performance parameter associated with associated with each of a plurality of database servers;

determining a list of one or more database servers of the plurality of database servers having performance parameters that do not fall within a predetermined range;

sorting the one or more database servers in the list according to their respective workloads indicated by the corresponding performance parameters;

selecting a first database server among the sorted one or more database servers, wherein the first database server has a heaviest workload;

selecting one or more database instances operating on the first database server, wherein each of the one or more database instances is a set of memory structures that manage database files; and instructing the first database server to migrate the one or more database instances to a-one or more receiving database servers.

30. The computer-readable medium of claim 29, wherein:
the performance parameter includes at least one of: CPU usage, memory usage, disk input/output speed, network transmission speed, or disk usage.

31. The computer-readable medium of claim 29, wherein:
the predetermined range includes an upper threshold; and
performance parameters associated with each of the one or more receiving database servers is below the upper threshold.

32. The computer-readable medium of claim 29, wherein:
the predetermined range includes a lower threshold; and
performance parameters associated with each of the one or more receiving database servers is below the lower threshold.

33. The computer-readable medium of claim 29, wherein the set of instructions that is executable by the at least one processor of the device to cause the device to further perform:

determining whether a database server of the plurality of database servers is associated with a corresponding performance parameter expectation; and after it is determined that the database server is associated with the corresponding performance parameter expectation, substituting the obtained performance parameter with the performance parameter expectation.

34. The computer-readable medium of claim 33, wherein the performance parameter expectation is associated with a validity period, and wherein the set of instructions that is executable by the at least one processor of the device to cause the device to further perform:

determining whether a current time is within the validity period; and after it is determined that the current time is within the validity period, substituting the obtained performance parameter with the performance parameter expectation.

35. The computer-readable medium of claim 29, wherein the set of instructions that is executable by the at least one processor of the device to cause the device to further perform:

obtaining a performance parameter associated with a database instance of the one or more database instances;

determining whether the database instance is associated with a corresponding performance parameter expectation; and after it is determined that the database instance is associated with a corresponding performance parameter expectation, substituting the obtained performance parameter associated with the database instance with the performance parameter expectation.

36. The computer-readable medium of claim 35, wherein the performance parameter expectation is associated with a validity period, and wherein the set of instructions that is executable by the at least one processor of the device to cause the device to further perform:

determining whether a current time is within the validity period; and after it is determined that the current time is within the validity period, substituting the obtained performance parameter associated with the database instance with the performance parameter expectation.

37. The computer-readable medium of claim 29, wherein a database server of the plurality of database servers includes a plurality of database instances interrelated to one another, and wherein the set of instructions that is executable by the at least one processor of the device to cause the device to further perform:

determining a performance parameter associated with each of the plurality of database instances;

determining a largest performance parameter from the plurality of performance parameters respectively determined for the plurality of database instances; and substituting the performance parameter associated with each of the plurality of database instances with the largest performance parameter.

38. The computer-readable medium of claim 37, wherein the plurality of database instances include a master database instance and a backup of the master database instance.

39. The computer-readable medium of claim 29, wherein the selecting one or more database instances operating on the database server comprises selecting one or more database instances operating on the first database server, such that after migrating the selected one or more database instances from the first database server, the performance parameter of the first database server falls within the predetermined range.

40. The computer-readable medium of claim 29, wherein selecting the one or more database instances includes:

sorting database instances operating on the first database server according to their respective workloads;

selecting a first database instance from the sorted database instances, wherein the first database instance has a lowest workload; and selecting additional one or more database instances from the sorted database instances for migration according to an ascending order of workload until the performance parameter of the first database server falls within the predetermined range after migration.

41. The computer-readable medium of claim 29, wherein the set of instructions that is executable by the at least one processor of the device to cause the device to further perform placing the first database server in an offline mode after migration.

42. The computer-readable medium of claim 41, wherein the set of instructions that is executable by the at least one processor of the device to cause the device to further perform:
- sorting the one or more database servers in the list according to their respective workloads indicated by the corresponding performance parameters; and
- selecting the first database server from the sorted one or more database servers, wherein the first database server has a lightest workload.

* * * * *